July 12, 1938. R. T. BEDARD 2,123,559
TRAILER
Filed Jan. 4, 1938 3 Sheets-Sheet 1
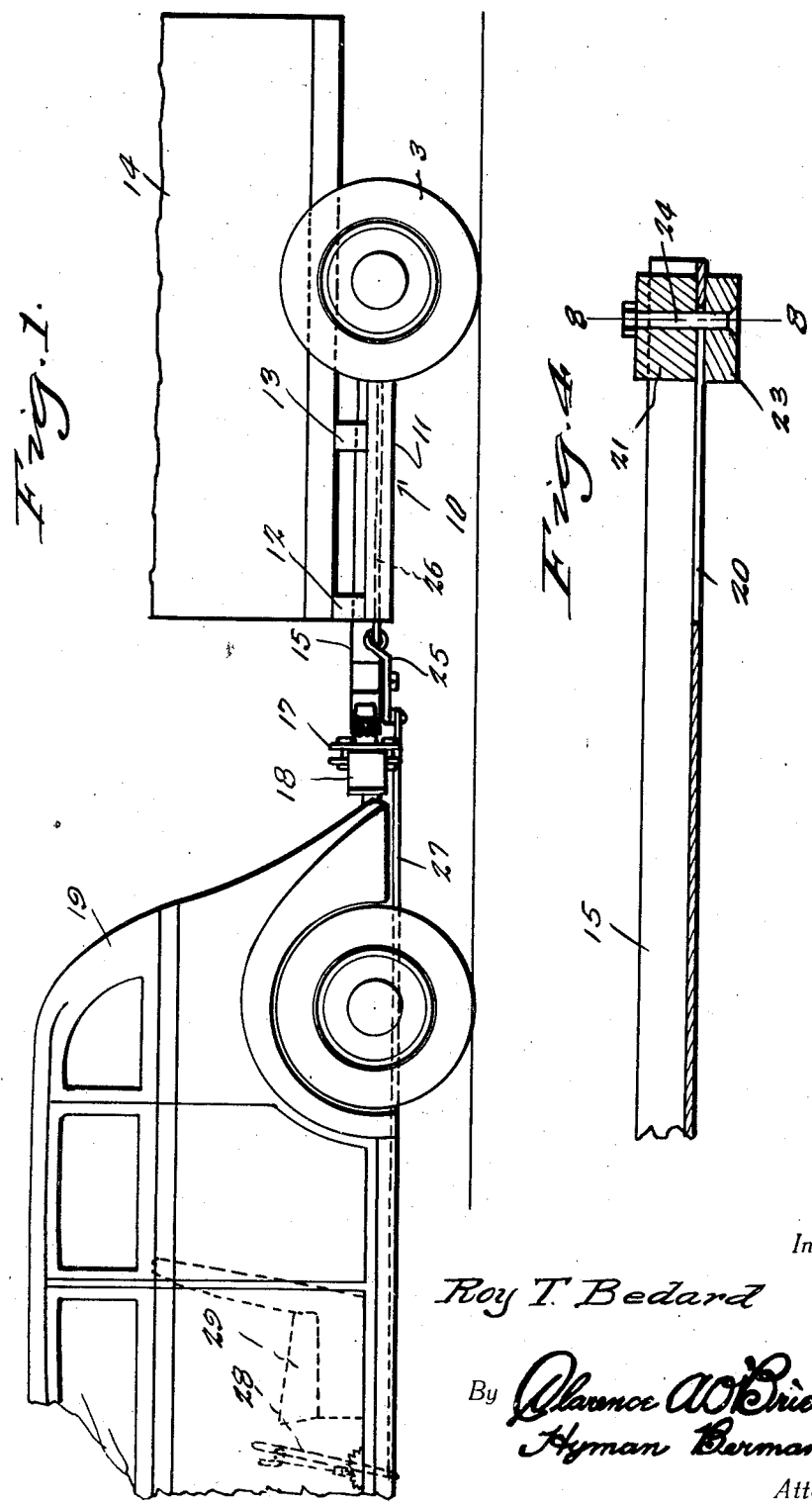
Inventor
Roy T. Bedard
By Clarence A. O'Brien
Hyman Berman
Attorneys

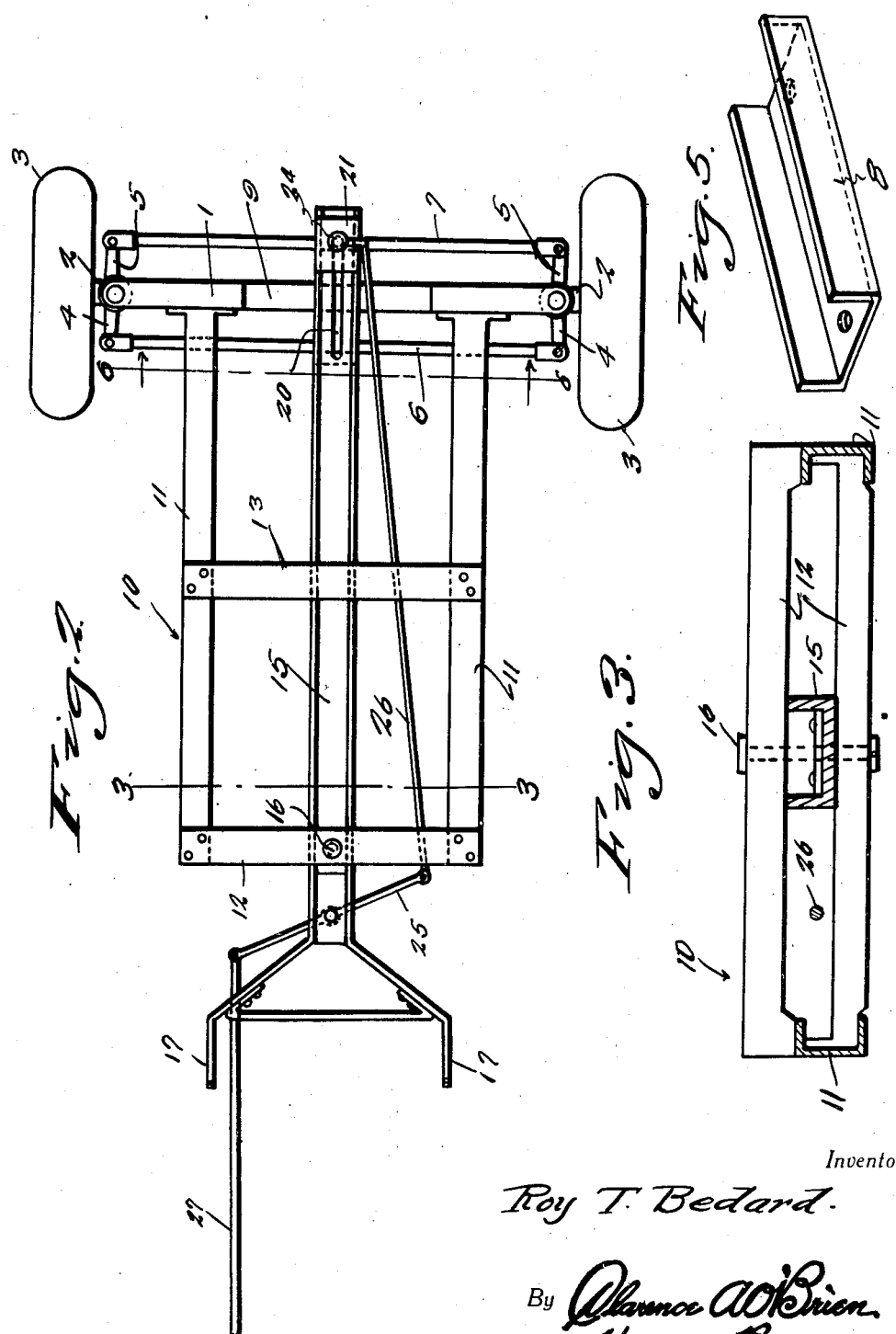

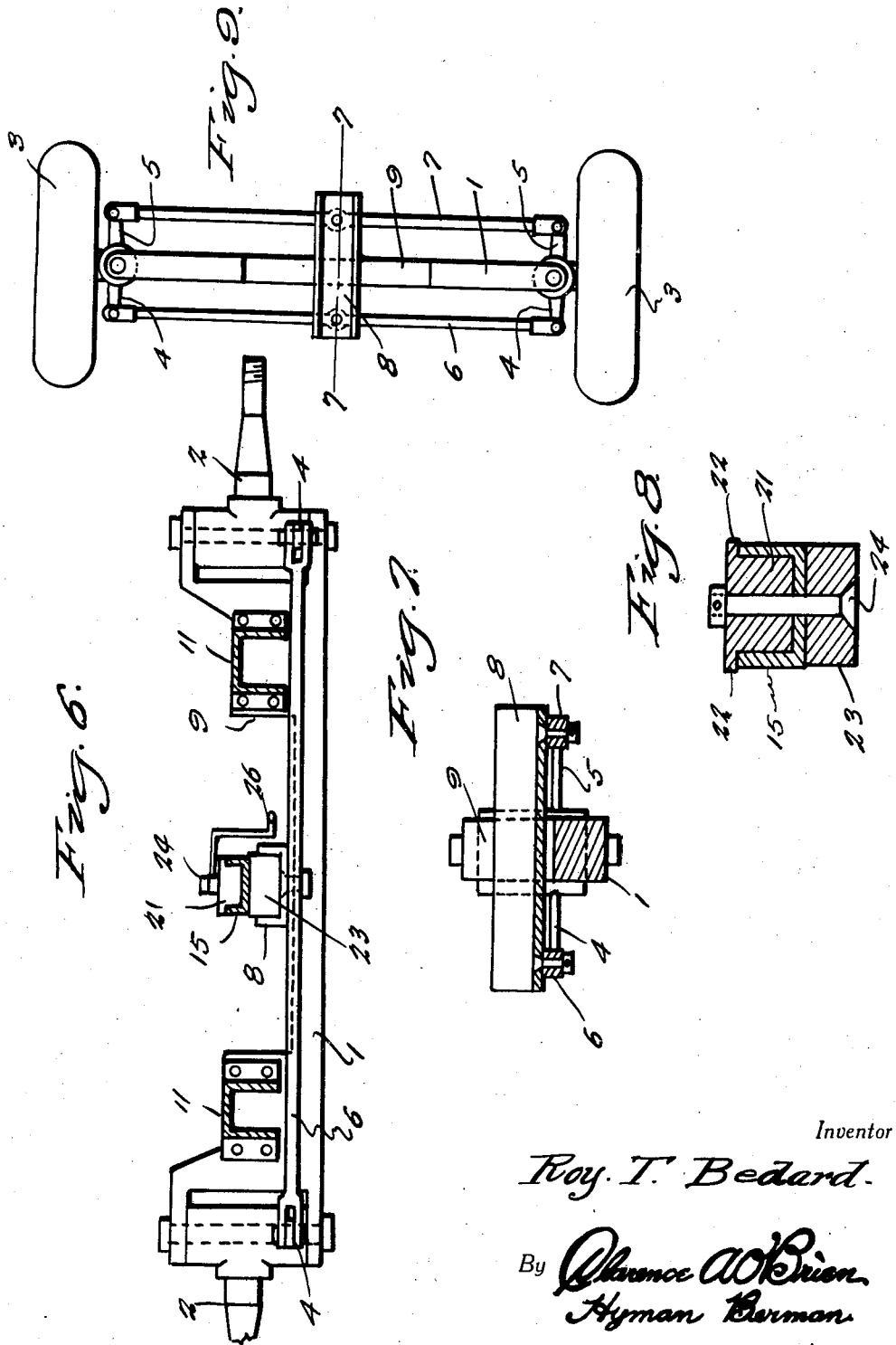

Patented July 12, 1938

2,123,559

UNITED STATES PATENT OFFICE 2,123,559

TRAILER

Roy Thomas Bedard, Escanaba, Mich.

Application January 4, 1938, Serial No. 183,357

3 Claims. (Cl. 280—33.55)

The present invention relates to new and useful improvements in trailers particularly of the two wheel type and has for one of its important objects to provide, in a manner as hereinafter set forth, a novel construction and arrangement for operating the wheels in a manner to steer the trailer as it travels behind the towing vehicle.

Another very important object of the invention is to provide a steering mechanism for trailers embodying a construction and arrangement which is such that the trailer wheels will practically track with the wheels of the towing vehicle.

Still another very important object of the invention is to provide a trailer steering mechanism of the character described comprising means operable from the driver's seat of the towing vehicle, whereby, when the trailer is backed, it will be caused to take a path with which the wheels of the pushing vehicle will track.

Other objects of the invention are to provide a steering mechanism for trailers which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an embodiment of the invention.

Figure 2 is a top plan view of the invention.

Figure 3 is a cross sectional view, taken substantially on the line 3—3 of Fig. 2.

Figure 4 is a view in vertical longitudinal section through the rear end portion of what may be hereinafter referred to as the tongue.

Figure 5 is a detail view in perspective of the connecting rod operating member.

Figure 6 is a cross sectional view, taken substantially on the line 6—6 of Fig. 2.

Figure 7 is a view in vertical longitudinal section, taken substantially on the line 7—7 of Fig. 9.

Figure 8 is a cross sectional view, taken substantially on the line 8—8 of Fig. 4.

Figure 9 is a top plan view of the axle, wheels, connecting rods, etc.

Referring now to the drawings in detail, it will be seen that the embodiment of the invention which has been illustrated comprises an axle 1 on the ends of which spindles 2 are mounted in the usual manner for swinging movement in a horizontal plane. Supporting wheels 3 are journalled on the spindles 2. Forwardly and rearwardly extending arms 4 and 5, respectively, are provided for swinging the spindles 2. Connecting rods 6 and 7 extend between the pairs of arms 4 and 5, respectively. The reference numeral 8 designates a longitudinal channel member which is mounted on the connecting rods 6 and 7 and pivotally connected thereto. The axle 1 is recessed, as at 9, to accommodate the channel member 8.

Fixed to the axle 1 and extending forwardly therefrom is a frame structure which is designated generally by the reference numeral 10. The frame structure 10 includes side members 11 and pairs of vertically spaced cross members 12 and 13. The reference numeral 14 designates the body of the trailer.

The reference numeral 15 designates a tongue in the form of a channel iron which is pivotally secured at an intermediate point adjacent its forward end between the cross members 12, as at 16. On its forward end, the tongue 15 is provided with means 17 for connection to the rear bumper 18 of a towing vehicle 19. The tongue 15 is adapted to swing between the cross members 13 and extends rearwardly over the channel member 8, the axle 1, the connecting rods 6 and 7, etc. Formed in the rear end portion of the tongue 15 is a longitudinal slot 20. Mounted for longitudinal sliding movement in the rear end portion of the substantially channel shaped tongue 15 is a body 21 of suitable material comprising lateral flanges 22, (see Fig. 8) which travel on the upper edges of the tongue 15. Rotatably mounted beneath the body 21 and slidable beneath the tongue 15 is a block 23 which is slidably engaged in the channel member 8. The block 23 is rotatable on a bolt 24 which depends from the body 21, said bolt 24 travelling in the slot 20 of the tongue 15. It will thus be seen that the tongue 15 is operatively connected to the connecting rods 6 and 7.

Pivotally mounted, at an intermediate point, beneath the forward end portion of the tongue 15 is a lever 25. A rod 26 operatively connects the body 21 to the lever 25 for actuation thereby in the substantially channel shaped tongue 15. The other end of the lever 25 is connected by a rod 27 to a hand lever 28 which is mounted on the usual transmission of the towing vehicle 19 for convenient operation from the driver's seat 29.

It is thought that the operation of the apparatus will be readily apparent from a consideration of the foregoing. As the towing vehicle negotiates turns, and with the body 21 in the position shown in Fig. 2 of the drawings, the tongue 15, when it swings on its pivot 16, will shift the connecting rod 7 in a manner to swing the wheels 3 in the direction of the turn being made. The construction and arrangement is such that the wheels 3 will substantially track with the wheels of the towing vehicle. When it is desired to back the trailer the body 21, with the block 23, is shifted forwardly of the axle 1 adjacent the front connecting rod 6 through the medium of the elements 25, 26, 27 and 28. Then, when the tongue 15 swings on its pivot 16 the action of the wheels 3 is the reverse of that previously described, said wheels being actuated from said tongue through the front connecting rod 6. The slidably mounted block 23 constitutes means for operatively connecting the tongue 15 either to the connecting rod 7 or the connecting rod 6.

It is believed that the many advantages of a trailer steering mechanism constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:—

1. A trailer comprising a pair of swinging supporting wheels, parallel rods operatively connected to said wheels on opposite sides of the axes about which the wheels swing, a swinging member, and means operatively connecting said member selectively to the rods for swinging the wheels in opposite directions relative to the trailer when said member swings in a given direction, said means including a member pivotally connected to the rods, and means slidably mounted on the first named member and slidably engaged with the second named member for operatively connecting said second named member to said first named member.

2. A trailer comprising a pair of swinging supporting wheels, parallel rods operatively connected to said wheels on opposite sides of the axes about which the wheels swing, a channel member pivotally connected to the rods, a swinging tongue, a member slidably mounted on said tongue and slidably engaged in the channel member, and means for actuating the second named member, said second named member constituting means for operatively connecting the tongue selectively to the rods for swinging the wheels in opposite directions relative to the trailer when the tongue swings in a given direction.

3. A trailer comprising an axle, spindles journalled on the ends of said axle for swinging movement in a horizontal plane, wheels journalled on the spindles, arms fixed to the spindles and projecting in opposite directions therefrom, parallel connecting rods extending between pairs of the arms, a channel member pivotally connected at its end portions to the rods, a frame extending forwardly from the axle, a substantially channel shaped tongue pivotally mounted, at an intermediate point, on the frame, means on one end of the tongue for connection with a towing vehicle, the other end portion of the tongue having a longitudinal slot therein, a body slidably mounted in said other end portion of the tongue, an element mounted vertically in said body and depending therefrom and operable in the slot, a block pivotally mounted on said element and slidably engaged in the channel member, and means connected to the body for actuating same for shifting the block in the channel member, said block, element, body and channel member constituting means for operatively connecting the tongue selectively to the rods for swinging the wheels in opposite directions relative to the trailer upon actuation of the tongue in a given direction.

ROY THOMAS BEDARD.